(12) United States Patent
Ferguson et al.

(10) Patent No.: US 6,181,451 B1
(45) Date of Patent: Jan. 30, 2001

(54) FILTER SELECTOR

(75) Inventors: Stephen P Ferguson, Coventry; Antony M Thorley, West Lothian, both of (GB)

(73) Assignee: Marconi Communications Limited (GB)

( * ) Notice: Under 35 U.S.C. 154(b), the term of this patent shall be extended for 0 days.

(21) Appl. No.: 09/040,617

(22) Filed: Mar. 18, 1998

(30) Foreign Application Priority Data

Jun. 26, 1997 (GB) .................................................. 9713575

(51) Int. Cl.⁷ ...................................................... H04J 14/02
(52) U.S. Cl. ............................. 359/127; 359/124; 385/24
(58) Field of Search .................................. 359/124, 127, 359/130; 385/24

(56) References Cited

U.S. PATENT DOCUMENTS 5,706,375 * 1/1998 Mihailov .................................. 385/24
5,726,785 * 3/1998 Chawki et al. ........................ 359/130
6,020,986 * 1/2000 Ball ....................................... 359/130

FOREIGN PATENT DOCUMENTS 0 733 921 A2    9/1996   (EP) .

* cited by examiner

Primary Examiner—Kinfe-Michael Negash
(74) Attorney, Agent, or Firm—Kirschstein, et al.

(57) ABSTRACT

In an optical telecommunications system using wave division multiplexing (WDM) a wavelength add-drop multiplexer (WADM) has an array of adjacently connected filters, each for selecting light of a respective wavelength being transmitted in a multiplexed data stream along an optical fibre, each of the array of filters being adjacently connected to a portion of the array which is a nominally transparent filter and having means for moving the array so that movement between filters in use occurs via the nominally transparent filter portion of the array. Further, in a method of operating a WADM the transition between two filters of an array of filters each for selecting light of a respective wavelength being transmitted in a multiplexed data stream along an optical fibre occurs by way of a nominally transparent filter portion of the array.

12 Claims, 2 Drawing Sheets

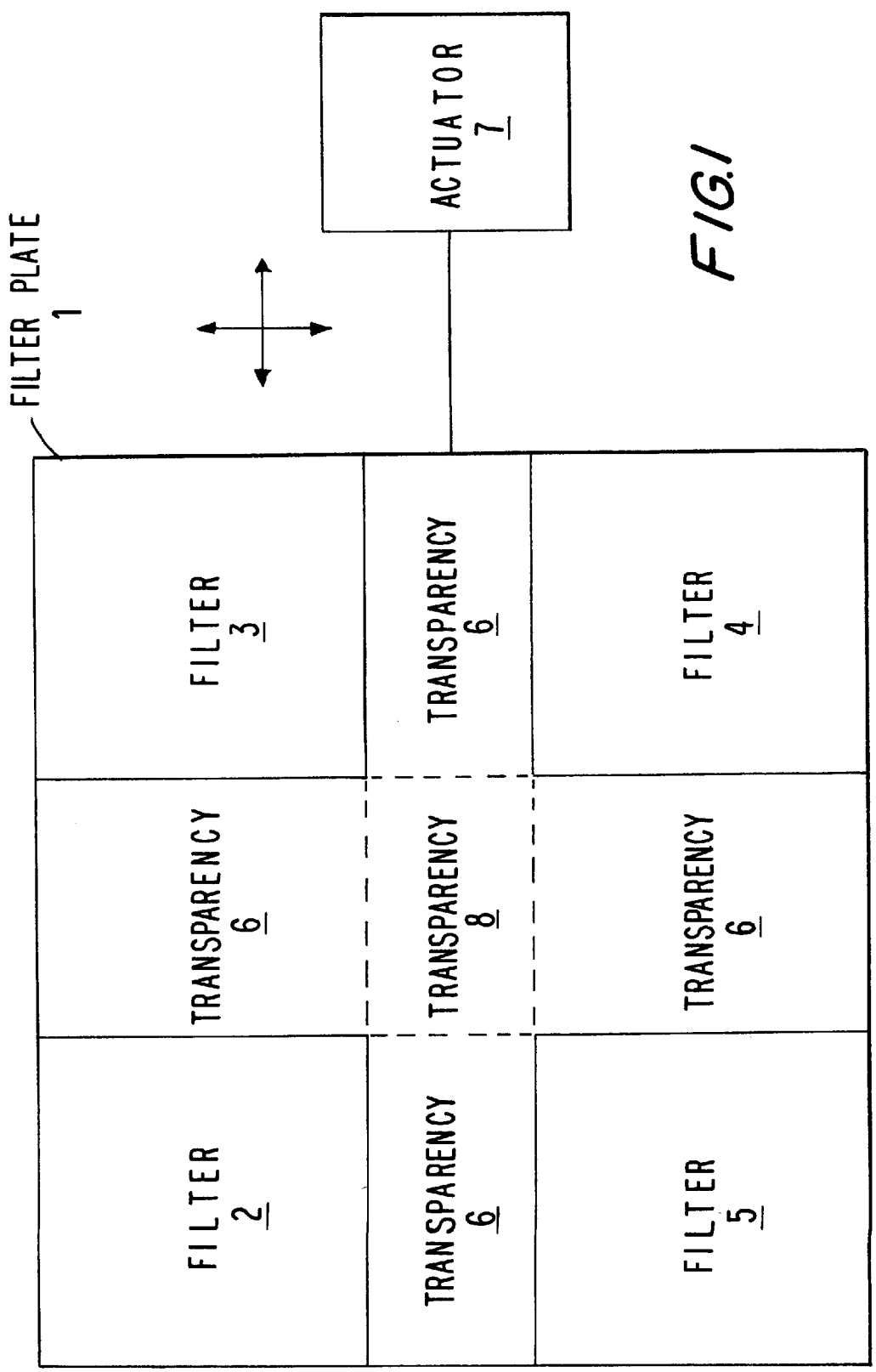

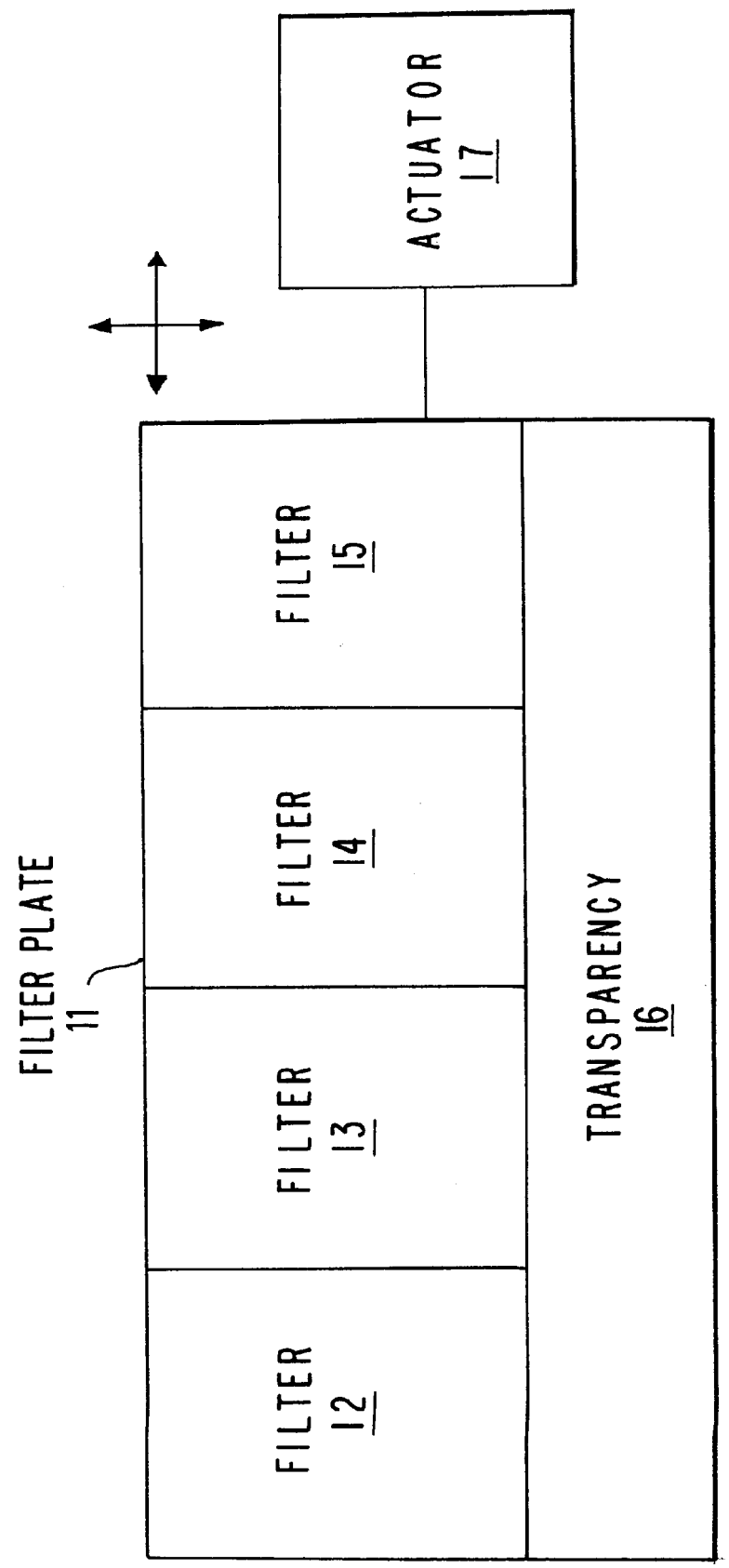

FILTER SELECTOR

BACKGROUND OF THE INVENTION

Field of the Invention

In optical telecommunications transmission, there is a growing use of wavelength division multiplexing (WDM). In current WDM systems, different wavelengths of invisible light are each modulated in some way, and combined by multiplexing onto the same optical fibre. The modulation of each wavelength may be analogue or digital, with various rates and protocols, or combinations of them, in order to carry telecommunications traffic such as data, video and voice. At a receiving equipment, conventionally the different wavelengths are separated and demodulated individually.

It is economically attractive to be able to access just some of the wavelengths passing along a fibre, without incurring the expense and other consequences of demultiplexing them all. Access could involve removing or copying light from the fibre at a given wavelength, and/or adding light at the same, or at another wavelength if there is a gap in the spectrum of light already on the fibre. An equipment which provides this feature is a wavelength add-drop multiplexer (WADM). Typically 16 wavelengths might be carried on one fibre, and access to up to say 4 of them might be needed at one site.

It is especially important to be able to change or reconfigure the selection of wavelengths which are to be accessed by remote control. This is in keeping with the general trend of telecommunications transmission towards "managed bandwidth", by which traffic is increasingly routed around the network as required under central control, via network elements such as SDH (Synchronous Digital Hierarchy) add-drop multiplexers (ADMs) and digital cross-connects.

Various filter technologies exist for WDM multiplexing and demultiplexing, and some are applicable to WDMs. Most of the technologies which allow wavelength access to be configurable have significant performance limitations. This reflects the common fact in systems engineering that an element which is variable in one parameter often performs more marginally in that parameter and also in other parameters, compared with a fixed element.

One way to overcome this problem is to use a set of reflective wavelength filters, each fixed in its wavelength selection, and to introduce different filters into the through path as required. Such filters can achieve high performance in terms of extinguishing the selected wavelength while not affecting others. The introduction of a specific filter would cause its wavelength, when received, to be reflected to one side and thereby dropped to a specified user, and would allow light of the same wavelength to be introduced or added from the side and reflected into the onwards through path.

The potential hazard which arises is that the change from one wavelength filter to another could disturb the total traffic in some way, by temporarily interrupting other wavelengths. Even a disturbance lasting a few nanoseconds or less could cause traffic loss lasting many milliseconds or more, because of the nature of the traffic typically carried. Similarly, a minor but sudden change in the path length of the light, such as by total removal of a filter, could cause disruption. Many telecommunications applications, such as transmission of SDH traffic, cannot tolerate such disruption. The present invention avoids removal of the filter substrate from the path.

One possible way to provide selection between a number of filters is to move each in turn into a light beam, while ensuring by some means that the transition between filters does not disrupt wavelengths for which filters are not being applied. The light beam can be formed by lenses, such that light leaves a fibre, is focussed into a parallel beam of light which passes through space into another lens and is refocussed into another fibre. Suitable commercial devices exist for this purpose, and filters or other components could be introduced into the beam, which may typically be 20 mm long.

SUMMARY OF THE INVENTION

According to the present invention there is provided in an optical telecommunications system using wave division multiplexing (WDM) a wavelength add-drop multiplexer (WADM) comprising an array of filters adjacently connected, each for selecting light of a respective wavelength being transmitted in a multiplexed data stream along an optical fibre, each of the array of filters being adjacently connected to a portion of the array which is a nominally transparent filter and means for moving the array so that movement between filters in use occurs via the nominally transparent filter portion of the array.

There is further provided in an optical telecommunications system using WDM, a method of operating a WADM wherein the transition between two filters of an array of filters each for selecting light of a respective wavelength being transmitted in a multiplexed data stream along an optical fibre occurs by way of a nominally transparent filter portion of the array.

BRIEF DESCRIPTION OF THE DRAWINGS

The present invention will now be described, by way of example, with reference to the accompanying drawings, in which:

FIG. 1 shows one possible filter arrangement in accordance with the present invention; and FIG. 2 shows an alternative possible filter arrangement.

DETAILED DESCRIPTION OF THE INVENTION

It could be arranged mechanically as shown in FIG. 1 by having a cross-shaped glass filter plate 1, with a different filter 2, 3, 4, 5 in each arm of the cross, and a nominal transparency 6 at all other areas of the cross, notably the center 8. A two-motion actuator 7 could then move each filter arm in turn into the beam controlled so as to always pass through the center position 8 of the cross. A rotation of the filter plate 1 in its own plane would not be acceptable because it would result in unwanted interruptions to other wavelengths as the plate is moved between two selected wavelengths whose filters were not adjacent on the cross.

An alternative method, suitable for selecting between an almost unlimited number of wavelengths, as shown in FIG. 2, could be the use of a line of filters 12, 13, 14, 15 along a plate 11 and having a nominally transparent area 16 parallel to the filters 12, 13, 14, 15 which could be moved by a two-motion actuator 17 sideways in its own plane in order to move between clear and filtered areas, and lengthwise in order to select the next filter.

The times associated with the movement of such filters could be well under a second, which would be compatible with the response times of existing remote management systems used for bandwidth management. Where faster response is needed, perhaps for protection switching within scores of milliseconds between two alternative routes, then a simpler mechanism with just two filters could be used.

In order to access multiple wavelengths at the same time, multiple assemblies as described above could be placed sequentially in the light beam. Each would reflect just the selected wavelength, allowing the others to pass through to the next assembly with relatively little of light energy.

A key requirement of the mechanical system would be high reliability, irrespective of whether the period between reconfigurations were milliseconds or years. Either could occur in telecommunications applications.

What is claimed is:

1. In an optical telecommunications system for transmitting a multiplexed data stream along an optical fiber using wave division multiplexing, a wavelength add-drop multiplexer comprising:
   a) a movable filter plate including a plurality of filter portions each for selecting light of a respective wavelength for transmission along the fiber, and at least one transparent portion adjacent at least one of the filter portions, all of said filter and transparent portions lying in a common plane; and
   b) means for moving the filter plate into alignment with the fiber from a first position in which a selected one of the filter portions is aligned with the fiber, to an intermediate position in which said at least one transparent portion is aligned with the fiber, and to a second position in which a selected other of the filter portions is aligned with the fiber.

2. The multiplexer of claim 1, wherein the moving means is operative for moving the filter plate along two mutually orthogonal directions.

3. The multiplexer of claim 2, wherein the plurality of filter portions is arranged in succession along a row along one of the directions, and wherein said at least one transparent portion extends along the plurality of filter portions in a direction generally parallel to said one direction.

4. The multiplexer of claim 3, wherein the filter portion sand said at least one transparent portion share a common linear edge.

5. The multiplexer of claim 2, wherein said at least one transparent portion is located between said selected one and other of the filter portions as considered along one of said directions.

6. The multiplexer of claim 5; and further comprising another transparent portion lying in said common plane and located between said selected one and other of the filter portions as considered along another of said directions.

7. The multiplexer of claim 2, wherein said at least one transparent portion extends along both said directions.

8. The multiplexer of claim 1, wherein said filter plate has a plurality of transparent portions.

9. The multiplexer of claim 1, wherein the plate has corner regions, and wherein the filter portions are located at the corner regions.

10. The multiplexer of claim 1, wherein the filter plate is constituted of a glass material.

11. In an optical telecommunications system for transmitting a multiplexed data stream along an optical fiber using wave division multiplexing, a method of operating a wavelength add-drop multiplexer comprising the steps of:
   a) arranging on a filter plate a plurality of filter portions each for selecting light of a respective wavelength for transmission along the fiber, and at least one transparent portion adjacent at least one of the filter portions, all of said filter and transparent portions lying in a common plane; and
   b) moving the filter plate into alignment with the fiber from a first position in which a selected one of the filter portions is aligned with the fiber, to an intermediate position in which said at least one transparent portion is aligned with the fiber, and to a second position in which a selected other of the filter portions is aligned with the fiber.

12. The method of claim 11, wherein the moving step is performed by moving the filter plate along two mutually orthogonal directions.

* * * * *